Oct. 3, 1967    M. B. FELL ETAL    3,345,031
REMOVABLE FORM FOR USE IN CEMENT LINING PIPE
Filed Sept. 3, 1964

Inventors
Morris B. Fell
Connie J. Burdick
By Head & Johnson
Attorneys

3,345,031
REMOVABLE FORM FOR USE IN CEMENT LINING PIPE

Morris B. Fell and Connie J. Burdick, Tulsa, Okla., assignors to The Bradford Companies, Tulsa, Okla., a partnership
Filed Sept. 3, 1964, Ser. No. 394,366
1 Claim. (Cl. 249—204)

This invention relates to a removable form for use in cement lining pipe. More particularly, the invention relates to a removable form providing means for accurately defining the ends of cement utilized to line pipe and simultaneously providing an end protector for the pipe.

In many industries, and particularly in the oil industry, it has long been a practice to cement line pipe to more particularly adapt the pipe for certain applications. Although not limited to such an application, one of the important uses of cement lined pipe is carry corrosive liquids, such as salt water, which would normally soon deteriorate unprotected metal pipe.

The most usual method of cement lining pipe is to place the pipe in a horizontal position, deposit a quantity of cement slurry therein and spin the pipe rapidly causing the slurry to spread evenly on and adhere to the interior surface of the pipe.

A difficult problem connected with cement lining pipe is that of providing well formed ends to the cement lining, that is the problem of causing the cement lining to be of uniform thickness at the end and terminate in a plane of the end of the pipe. It can be seen that if the cement slury is allowed to extend beyond the end of the pipe it will interfere with the abutting joints of the pipe as they are assembled together. On the other hand, if the cement slurry is permitted to terminate interiorly of the pipe so that the cement lining end is not perfectly formed, corrosive liquid carried by the pipe will soon attack it.

In the past, it has been a practice to affix a metal clamp to each end of the pipe being cement lined, the clamp providing a dam around the circumferential end of each end of the pipe to retain the cement. After the cement slurry has been applied and the pipe spun to cause the slurry to adhere uniformly to the interior, such metal forms are removed. This practice has several disadvantages, such as:

(a) The metal forms are exceedingly time consuming to place and remove from the ends of the pipes.
(b) Perfectly fitting the forms to provide good uniform cement lining at the ends is difficult.
(c) When the metal forms are removed the ends of the pipe remain exposed so that the cement lining is easily broken during hauling and handling of the pipe.

It is a general object of this invention to overcome the objects and limitations in the presently used devices for cement lining pipe.

More particularly, an object of this invention is to provide a removable form for use in cement lining pipe which is extremely simple and economical in construction and is thereby particularly adapted to be of the disposable type.

Another object of this invention is to provide a removable form for use in cement lining pipe which is simple and economical of construction and which can be used for the dual purpose of serving as a form for the cement lining of the pipe and, following the cement lining operation, can be left on the pipe to function as a protector.

These and further objects of the invention will be fulfilled, and a better understanding of the invention will be had by referring to the following description and claim taken in conjunction with the attached drawings in which:

This invention may be described as a removable form for cement lining pipe. More particularly, but not by way of limitation, the invention may be described as a removable form for use in cement lining pipe comprising an elastic tubular member of relatively short axial length having an integral circumferential lip portion at one end, the lip portion defining an axial opening of reduced internal diameter, and a rigid flat relatively thin disc of external diameter substantially that of the internal diameter of the tubular member, the disc having a reduced internal diameter axial opening therein, the disc positioned coaxially within the tubular member adjacent the lip portion.

Figure 1:
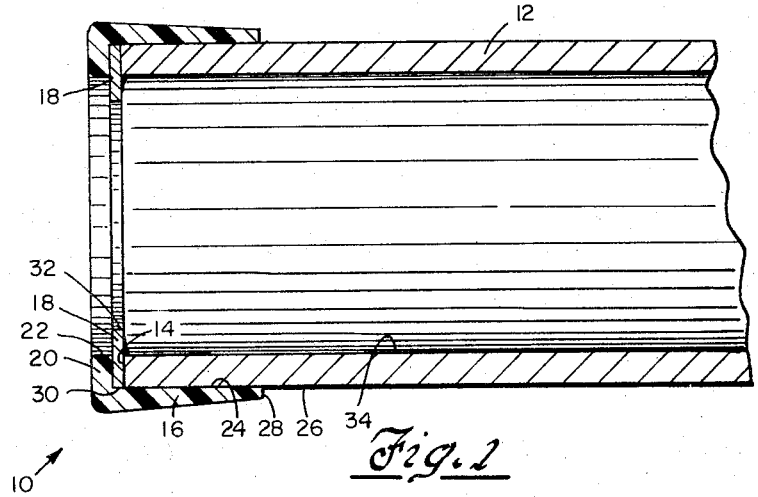
FIGURE 1 is a cross-sectional view of a length of pipe showing the removable form for cement lining of this invention positioned on the pipe.

Referring now to the drawings and first to FIGURE 1, the removable form for cement lining pipe is generally indicated by the numeral 10 and is shown in cross-section as affixed to the end portion of a length of pipe 12. The pipe 12 terminates at each end, only one end of which is shown, in a planer end 14. The pipe 12 may be of any material but typically is of steel and, as has been previously set forth, is quite frequently cement lined to prevent attack by certain corrosive liquids.

The removable form 10 of this invention consists of two basic components, that is, a tubular member 16 and a disc member 18.

The tubular member 16 is typically constructed of some material such as plastic which is shock resistant and which has a degree of elasticity. The polypropylene plastics meet the requirements of the preferred characteristics of the tubular member 16 although, of course, it may be composed or formed of a variety of other materials. Tubular member 16 is of relatively short axial length compared to the pipe 12 on which it is utilized. The tubular member 16 has, at one end thereof an integral circumferential lip portion 20, the lip portion having an axial opening 22 therein. The tubular member 16 has an internal diameter 24 to receive the external diameter 26 of pipe 12. In the preferred embodiment the tubular member 16 is of elastic material having a normal internal diameter 24 slightly less than that of the external diameter 26 of the pipe so that when forced upon pipe 12 it naturally adheres to the pipe but in such a way that with manual force applied it can be removed. In the most preferred embodiment the normal internal diameter 24 of the tubular member 16 is slightly tapered so that the internal diameter adjacent the end 28 opposite the end having the lip portion 20 is equal to or greater than the external diameter 26 of the pipe so that the tubular member 16 is easily slipped onto the pipe.

As to further details of construction, the tubular member 16 is preferably of a tapered cross-sectional configuration as shown so that the portion adjacent the end 28 is of reduced thickness and the portion adjacent the lip portion 20 is of increased thickness. The lip portion 20 itself is preferably of increased thickness.

The second basic component, as previously indicated, is the disc member 18. It is preferably of some rigid material such as metal but may be composed of hard plastic. The disc member 18 has an external diameter 30 preferably substantially equal to the external diameter 24 of pipe 12. The disc 18 is provided with an axial opening 32 having an internal diameter less than the internal diameter 34 of pipe 12. In a preferred arrangement, the internal diameter of the axial opening 32 of disc 18 is such that the difference between it and the internal diameter of pipe 34 is equal to twice the thickness of the cement lining to be applied to the interior of pipe 12. Stating it more simply, in the preferred arrangement which is illustrated in FIGURE 2, the internal diameter 32 of disc 18 is such that when the cement lining 36 is applied the internal diameter of the lining is such as to coincide with the disc internal diameter 32.

Figure 2:
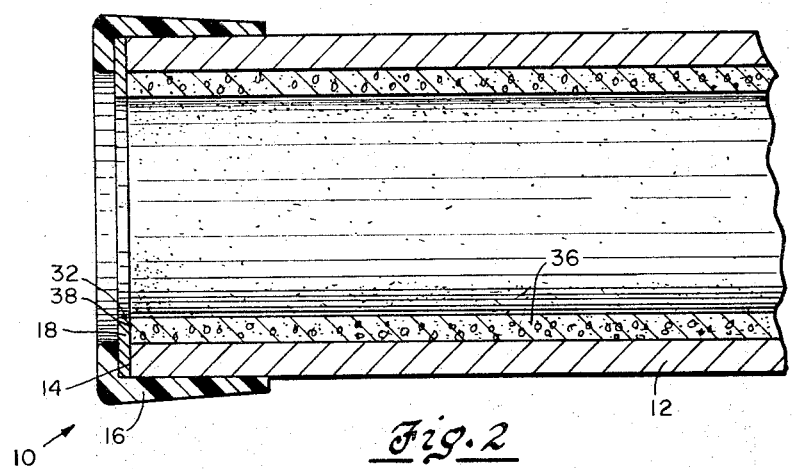
FIGURE 2 is a cross-sectional view as shown in FIGURE 1 but further showing the appearance of the pipe after cement lining has been applied utilizing the removable form for cement lining of this invention.

Referring especially to FIGURE 2, a section of length of pipe is shown having an internal cement lining 36 applied. Preparatory to applying the cement lining 36, the removable form 10 of this invention is inserted onto each end of the pipe 12. The cement slurry is placed into the pipe 12 and it is rotated rapidly causing the slurry to spread evenly through the full internal circumference of pipe 12 to form the lining 36. The provision of the removable form 10 of this invention provides means whereby the planer end 38 of the cement lining 36 coincides precisely with the planer end 14 of pipe 12.

After cement lining 36 is applied, the removable form 10 is, in the preferred method of use, kept on the pipe during shipment and handling and is not removed until immediately prior to the use of the pipe. In this manner the removable form 10 serves two basic and important functions. First, it serves to provide a form to insure that the end 38 of the cement lining 36 coincides precisely with the end 14 of pipe 12. Second, the removable form 10 serves as a protector for the pipe during shipment. The protector serves two main purposes, first preventing the cement lining 38 from being damaged by any foreign element striking the end 14 of pipe 12. Second, when the pipe has been threaded to receive threaded couplings at the end, the removable form 10 serves to protect the threads. While FIGURES 1 and 2 show the application wherein the pipe 12 is plain end, it can be seen that the removable form of this invention functions just as applicably when the pipe 12 is externally threaded at the ends.

Figure 3:
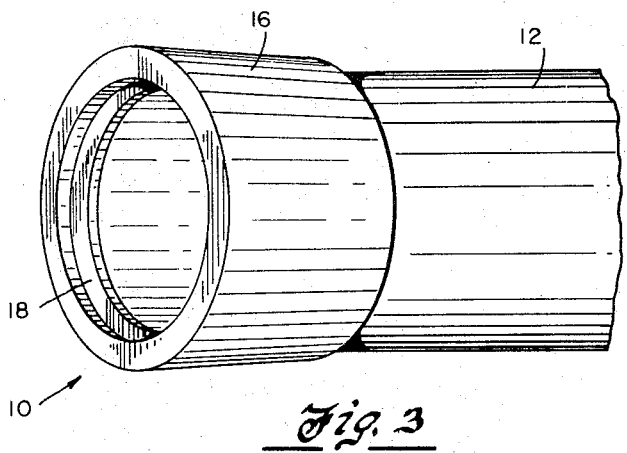
FIGURE 3 is an isometric view of the end portion of a length of pipe showing the device of this invention affixed thereto preparatory to the operation of cement lining the pipe.

FIGURE 3 is an isometric view showing the removable form 10 affixed to the end of pipe 12 preparatory to cement lining the pipe. The disc 18 is shown as it is supported in contact with the end of the pipe.

The removable form 10 may be placed on the pipe easily by inserting it over the end and driving it on manually by the use of the palm and heel of the hand. When a tighter fit is encountered, a flat object such as a board may be placed against the form and the object struck with a hammer to drive the form on. In a preferred arrangement the removable form 10 is dimensioned such that it is manually applied with only enough resistance to hold it securely in place but is manually removable when the time comes to utilize the pipe after it has been cement lined.

This invention sets forth a removable form for use in cement lining pipe which has many advantages, some of which are as follows:

(1) It is extremely simple and economical of construction.

(2) Due to the economy of construction the form is applied prior to cement lining operation and can be left on the pipe to serve as a protector.

(3) Due to its economical construction the removable form of this invention does not have to be removed for reuse as is the case with present clamping type devices, saving time and labor.

(4) The removable form 10 provides a means of achieving perfection of cement lining so that the planer end of the cement lining coincides precisely with the planer end of the pipe in a manner extremely difficult to achieve with known clamping arrangements.

Although the invention has been set forth with a certain degree of particularity, it is manifest that many changes may be made in the details of construction and the arrangement of components without departing from the spirit and scope of this disclosure. While the illustrated embodiment herein is exemplary of the invention it is not indicative of the scope or the limitations thereof. The scope of the invention is set forth in the following claim.

What is claimed:

A removable form and end protector for use to cement line a pipe, comprising:
 a resilient member having a tubular portion of short axial length relative to the pipe, at least a portion of the length of the tubular portion having a normal internal diameter smaller than the external diameter of the pipe, the tubular portion being adaptable to be pressed onto one end of the pipe, the member having an integral circumferential lip portion at one end of the tubular portion, the lip portion having an axial opening, the diameter of the opening being less than the internal diameter of the tubular portion; and
 a rigid flat relatively thin disc of external diameter substantially that of the pipe, the disc having an axial opening therein of diameter less than the internal diameter of the pipe, the disc positioned coaxially within the tubular member adjacent the lip portion to engage the end of the pipe.

References Cited

UNITED STATES PATENTS

| | | | |
|---|---|---|---|
| 1,768,451 | 6/1930 | Hume | 25—30 |
| 2,536,655 | 1/1951 | Nebesar. | |
| 2,801,039 | 7/1957 | Arneson | 215—41 |
| 2,814,405 | 11/1957 | Edwards | 215—41 |
| 3,183,572 | 5/1965 | Fritz | 25—30 |

FOREIGN PATENTS 128,542   4/1920   Great Britain.

J. SPENCER OVERHOLSER, *Primary Examiner.*

R. D. BALDWIN, G. A. KAP, *Assistant Examiners.*